No. 720,264. PATENTED FEB. 10, 1903.
D. F. LEPLEY.
VENTILATOR FOR MINES.
APPLICATION FILED JULY 25, 1901.
NO MODEL. 2 SHEETS—SHEET 2.
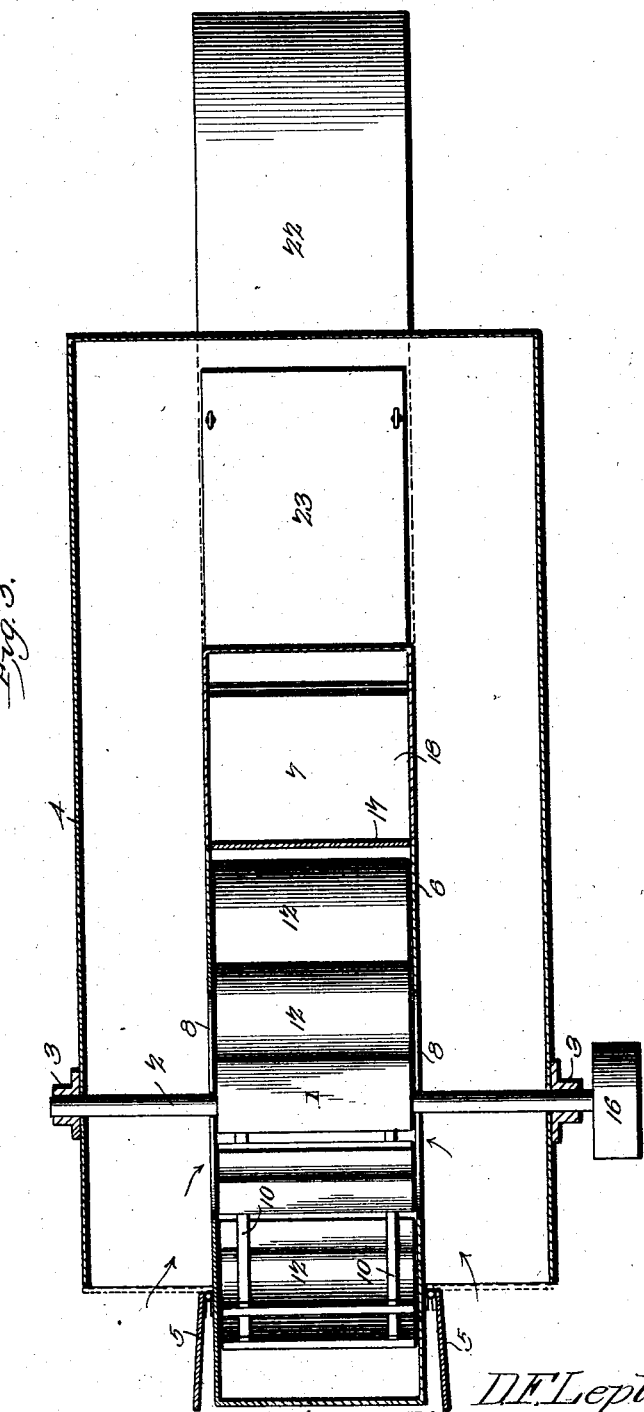

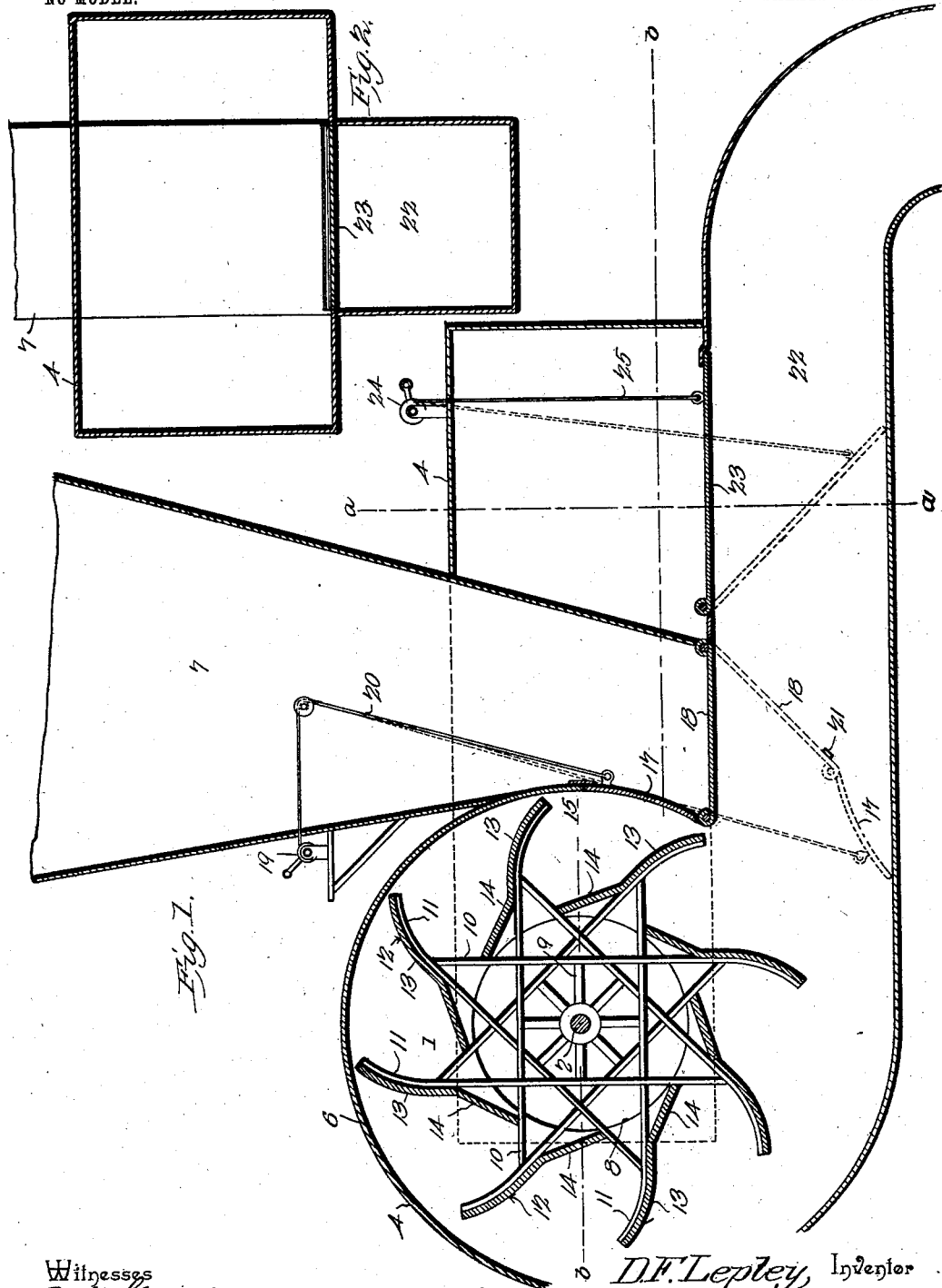

UNITED STATES PATENT OFFICE.

DANIEL F. LEPLEY, OF CONNELLSVILLE, PENNSYLVANIA.

VENTILATOR FOR MINES.

SPECIFICATION forming part of Letters Patent No. 720,264, dated February 10, 1903.

Application filed July 25, 1901. Serial No. 69,710. (No model.)

*To all whom it may concern:*

Be it known that I, DANIEL F. LEPLEY, a citizen of the United States, residing at Connellsville, in the county of Fayette and State of Pennsylvania, have invented a new and useful Ventilator for Mines, of which the following is a specification.

My invention is an improved ventilator for mines adapted for use either in forcing a current of air downwardly in a mining-shaft or for acting exhaustively for drawing air upwardly out of a mine-shaft to remove impure air or gases therefrom; and it consists in the peculiar construction and combination of devices hereinafter fully set forth and claimed.

In the accompanying drawings, Figure 1 is a vertical longitudinal sectional view of a mine-ventilator constructed in accordance with my invention. Fig. 2 is a vertical transverse sectional view of the same, taken on a plane indicated by the line *a a* of Fig. 1. Fig. 3 is a horizontal longitudinal sectional view of the same, taken on a plane indicated by the line *b b* of Fig. 1.

In the embodiment of my invention I provide a revoluble fan or blower 1, which is rotated by a shaft 2, that has its bearings, as at 3, in the sides of a hood 4. The said hood is here shown as disposed in a horizontal potion and as being rectangular in form and is provided at one end, which I will term the "outer" end, at opposite sides with doors 5, which may be opened or closed at will. A drum 6, which is cylindrical in form is disposed in a vertical position and extends centrally through the outer portion of the hood 4. On the inner side of the said drum is located the lower end of a vertical flue 7, the same being disposed centrally in the hood 4. The sides of the drum 6 are provided with intake-openings 8. Spokes 9 radiate from that portion of the shaft 2 which is disposed between the side walls of the drum, and the said spokes support bars 10, which are crossed with respect to each other and the outer ends of which are curved to form arms 11. The said spokes 9 and the said crossed bars 10 form an open framework, as will be understood. On the arms 11 are secured blades 12, which are disposed parallel with the shaft 2 and transversely with relation to the drum 6, and the said blades have outer portions curved in cross-section, as at 13, to correspond with the curvature of the arms 11. The inner portions of the said blades 13 are disposed at an obtuse angle with reference to the chord of the said curved portions of said blades, as at 14. It will be observed by reference to the drawings, more particularly to Fig. 1 thereof, that the fan or blower is located eccentrically in the drum 6 and that one side of the said fan or blower operates closely practically in contact with one side of the drum, as at 15. The said fan or blower is rotated by means of a power-belt and a pulley 16 in the direction indicated by the arrow in Fig. 1, and the convex faces of the blades of the blower approach the side 15 of the drum from below. An opening is made in the side 15 of the drum, which opening communicates with the lower end of the flue 7, as shown, and the said opening may be closed by the hinged wing 17 of a valve 18, the latter forming the bottom of the flue 7. A suitable winch 19 and elevating-cords 20 are employed for closing the valve 18 and its hinged wing 17, as shown in the solid lines in Fig. 1, or for opening the lower end of the flue 7 by lowering said valve and its hinged wing to a position indicated by the dotted lines in Fig. 1, in which position the valve 18 is maintained by contact with stops 21 in the sides of a flue 22, which leads from the lower portion of the drum and under the hood to a mining-shaft. In the bottom of the hood in rear of the flue 7 is a valve 23. The same may be disposed in a horizontal position to close communication between the said hood and the said flue 22, as shown in full lines in Fig. 1, or may be lowered to close the flue 22 and open communication between the latter and the hood, as indicated in dotted lines in Fig. 1. Any suitable means may be employed to operate the said valve 23. I here show a winch 24 and cords 25 for this purpose.

When it is desired to force a blast of air downwardly in the mine-shaft, the doors 5 are opened at the outer end of the hood and the valves 17, 18, and 23 are closed, as shown in Fig. 1. The fan being in motion, air is drawn inwardly thereby through the doors 5 and the intakes 8 and forced from the drum-casing through the flue 22 to the mine-shaft, as will be understood. When it is desired to exhaust air or gases from the mine-shaft, the doors 5 are closed and the valves 17, 18, and 23 lowered to close the flue 22 and establish communication between the latter and the hood and flue 7, the hood forming a by-pass to establish communication between the flue 22 and the drum 6.

The fan then continuing to revolve in the same direction acts exhaustively, the current being upward from the mine-shaft through a portion of the flue 22 to the valve 23, upwardly from the latter into the hood, outwardly in the hood to the openings 8, through the latter into the drum 6, and the action of the fan is such as to force the blast upwardly through the flue 7, the valves 17 18 being disposed in such position as to deflect the blast from the fan upwardly into the lower portion of the said flue 7.

Owing to the curved shape of the blades 12 of the fan or blower and the curved shape of that side of the drum and of the valve 17 which is proximate to one side of the blower the said curved valve 17 operates as a cut-off in coaction with each of the blades 12 in succession as the latter reach the said valve, and hence the current of air created by the rotation of the fan or blower is caused to pass outwardly therefrom through the flue 22 when the valves are in the position shown in Fig. 1. By thus cutting off the blast from the fan or blower that portion of the drum which is proximate to one side of the fan or blower is relieved of stress and vibration thereof is reduced to the minimum. Furthermore, the open construction of the frame of the fan or blower hereinbefore described, while reducing the weight thereof, adds greatly to its strength, the crossed bars 10 bracing each other, as will be understood.

While I have herein described my ventilator as especially adapted for use in ventilating mines and for exhausting air and gases therefrom, it will be understood that my ventilator may be also used for other purposes and in other connections, and I therefore do not limit myself in this particular. Neither do I desire to limit myself to the precise construction or combination of devices hereinbefore shown and described, as it is evident that modifications may be made therein without departing from the spirit of my invention.

Having thus described my invention, I claim—

1. In combination, a drum, a revoluble blower therein, a plurality of intersecting and tangentially-disposed flues connected to said drum, and a common cut-off forming a part of the blower-casing and located at the intersection of said flues to close communication between the drum and either of said flues.

2. In combination, a drum, a revoluble blower therein, intersecting flues leading tangentially from said drum, a common cut-off located at the intersection of said flues to close communication between the drum and either of said flues, and a valved by-pass connecting one of said flues and the intake of said drum.

3. In a ventilator, the combination of a drum, having an air-intake, a revoluble fan or blower in the drum, intersecting flues leading tangentially from the drum, a common cut-off located at the intersection of the flues to close communication between the drum and either of the flues at will, a by-pass leading from one of the flues to the air-intake in the drum, said by-pass having an air-inlet and a closure therefor, and a valve to open or cut off communication between the by-pass and the last-mentioned flue, substantially as described.

4. In a ventilator, the combination of a drum having air-intakes in its side walls, a revoluble fan or blower in the drum, intersecting flues 7, 22, leading tangentially from the drum, a valve, disposed at the intersection of said flues to close communication between either of them and the drum at will, a hood forming a by-pass between the flue 22 and the air-intakes of the drum, said hood having air-intake valves, and a valve to open or close communication between the hood and the flue 22, substantially as described.

5. The combination of a drum having an intake, a flue 22 leading from said drum, a revoluble fan or blower mounted eccentrically in one side of the drum, a flue 7 leading from the latter at the side thereof proximate to said fan or blower, and a valve 18 having a curved hinged wing 17 to open and close communication between said flue 7 and said fan or blower, said valve and said hinged wing 17 thereof when opened serving to close said flue 22, substantially as described.

6. A drum having intersecting flues 7, 22, leading tangentially therefrom, a common cut-off located at the intersection of said flues to close communication between the drum and either of said flues, a by-pass connecting one of the flues and the intake of the drum, said by-pass having an air-opening and a closure therefor, and a valve to open or cut off communication between the by-pass and the flue with which it connects, in combination with a revoluble fan or blower mounted eccentrically in the drum, and closely approaching the common cut-off, when the latter is in position to close communication between the drum and the flue 7, substantially as described.

7. In a ventilator, the combination of a drum, a fan or blower mounted therein, intersecting flues leading tangentially from said drum, a common cut-off located at the intersection of said flues to close communication between the drum and either of said flues, a by-pass connecting one of said flues and the intake of said drum, said by-pass having an air-opening and a closure therefor, and a valve to open or cut off communication between said by-pass and the flue with which it connects, substantially as described.

8. In a ventilator, the combination of a drum, and a fan or blower mounted therein, intersecting flues leading tangentially from said drum, a common cut-off located at the intersection of said flues to close communication between the drum and either of said flues, and an air-intake for the drum having means to control communication between the same and one of the flues, substantially as described.

9. In a ventilator, the combination of a drum and a fan or blower mounted therein, intersecting flues leading tangentially from said drum, a common cut-off located at the intersection of said flues to close communication between the drum and either flue, the opening movement of said cut-off from either of its operative positions being across the path and opposite the direction of the blast of the fan, and an air-intake for the drum, having means to control communication between the same and one of the flues, substantially as described.

10. In a ventilator, the combination of a drum, and a fan or blower mounted therein, a flue leading tangentially from the drum, a second flue also leading tangentially from the drum and intersecting the first-named flue, a cut-off having hingedly-connected members, which in one adjustment lie respectively between said flues, and between the first-named flue and the drum, and which, in another adjustment, span the second-named flue and form a continuation of that wall of the first-named flue which is remote from the fan, and an air-intake for the drum, provided with means to control communication with the second-named flue, substantially as described.

In testimony that I claim the foregoing as my own I have hereto affixed my signature in the presence of two witnesses.

DANIEL F. LEPLEY.

Witnesses:
W. H. BROWN,
GEO. FUEHOW.